US 8,905,065 B2

(12) United States Patent
Newman et al.

(10) Patent No.: US 8,905,065 B2
(45) Date of Patent: Dec. 9, 2014

(54) GAS BIASED PRESSURE REGULATOR

(76) Inventors: Shmuel Dovid Newman, Redondo Beach, CA (US); Jeffrey O. Brown, North Logan, UT (US)

(*) Notice: Subject to any disclaimer, the term of this patent is extended or adjusted under 35 U.S.C. 154(b) by 189 days.

(21) Appl. No.: 13/547,009

(22) Filed: Jul. 11, 2012

(65) Prior Publication Data
US 2013/0014835 A1    Jan. 17, 2013

Related U.S. Application Data

(60) Provisional application No. 61/506,404, filed on Jul. 11, 2011.

(51) Int. Cl.
*F16K 31/12* (2006.01)
*G05D 16/10* (2006.01)
*F02M 21/02* (2006.01)

(52) U.S. Cl.
CPC ......... *F02M 21/0239* (2013.01); *G05D 16/106* (2013.01); *Y02T 10/32* (2013.01); *Y10S 137/906* (2013.01)
USPC .................. 137/505.13; 137/505.43; 137/906

(58) Field of Classification Search
USPC ............. 137/505.13, 505.21, 505.41, 505.43, 137/906
See application file for complete search history.

(56) References Cited

U.S. PATENT DOCUMENTS

| | | | |
|---|---|---|---|
| 6,026,850 A * | 2/2000 | Newton et al. | 137/505.41 |
| 6,499,632 B2 * | 12/2002 | van't Hoff | 222/389 |
| 6,616,017 B2 * | 9/2003 | van't Hoff | 222/389 |
| 6,851,575 B2 * | 2/2005 | van't Hoff | 222/55 |
| 7,481,241 B2 | 1/2009 | Carpenter et al. | |
| 7,748,578 B2 * | 7/2010 | van't Hoff | 222/389 |
| 2001/0050076 A1 * | 12/2001 | Colby | 124/74 |
| 2002/0179151 A1 * | 12/2002 | van't Hoff | 137/505.41 |
| 2006/0180615 A1 * | 8/2006 | Vanblaere et al. | 222/386.5 |
| 2008/0083462 A1 * | 4/2008 | Smeller et al. | 137/505.42 |
| 2009/0101215 A1 * | 4/2009 | Colby et al. | 137/505.42 |

FOREIGN PATENT DOCUMENTS

WO    2010-083358 A1    7/2010

OTHER PUBLICATIONS

KIPO International Search Report (ISR) and Written Opinion (WO) in co-pending application PCT/US2012/046324, (Mailed Nov. 28, 2012).

* cited by examiner

*Primary Examiner* — Craig Schneider
*Assistant Examiner* — Jessica Cahill
(74) *Attorney, Agent, or Firm* — Lance M. Pritikin

(57) ABSTRACT

Exemplary embodiments of a gas biased pressure regulator comprise a capsule subassembly and a regulator body. The regulator body is adapted to connect to a source of pressurized gas. The capsule subassembly is removably received within the regulator body and includes a capsule body and a piston. The piston is axially slidable between fluid release and fluid seal configurations. When the piston is in its fluid release configuration, an output chamber is placed in fluid communication with the source. When the piston is in its fluid seal configuration, the output chamber is sealed from fluid communication with the source. A pressurizable bias chamber within the capsule body contains a bias pressure urging the piston toward its fluid release configuration. Pressure from the source urges the piston toward its fluid seal configuration. The piston may also have a fluid charge configuration for facilitating the pressurization of the bias chamber.

14 Claims, 13 Drawing Sheets

GAS BIASED PRESSURE REGULATOR

RELATED APPLICATIONS

This application claims the benefit of U.S. Provisional Application No. 61/506,404, filed on Jul. 11, 2011, the contents of which are incorporated by this reference in its entirety for all purposes as if fully set forth herein.

TECHNICAL FIELD

The present invention relates generally to regulators for regulating gas from a tank that contains compressed gas to a paintball gun, marker, or other application designed to utilize or be activated by gas at a controlled pressure.

BACKGROUND

Pressure regulators are commonly relied on to reduce the pressure of a gas as it is delivered from a pressurized gas reservoir, such as a portable compressed air tank, to an application device, such as a paintball marker. Paintball markers may feature a gas pressure regulator which is typically directly connected to the mouth of a portable tank designed to store gasses at very high pressures, typically between 3000-4500 psi. Commonly referred to as "tank regulators," these gas pressure regulators may reduce the pressure of the gas delivered from the tank down to, for example, 600-800 psi before the gas enters the paintball marker for use in firing a projectile.

Conventional gas pressure regulators, such as those used in the sport of paintball, are commonly designed so that the unregulated high pressure from the reservoir applies a force which works toward disengaging the seal between the source chamber and the output chamber. As a result, such regulators can easily fail in the open position when dirt and debris become trapped between the respective valve seat and seal. Such failures may enable the unrestricted flow of unregulated pressurized gas from the pressurized gas reservoir into the application device, causing safety concerns as well as damage to the application device.

SUMMARY

Certain deficiencies of the prior art may be overcome by the provision of a pressure regulator comprising a regulator body and a capsule subassembly. The regulator body may have a source end, an application end and a main bore extending therebetween, a first portion at the source end and a second portion at the application end. The source end may be adapted to being placed in fluid communication with a source of pressurized gas.

Examples of a capsule subassembly may include a capsule body, a piston, a seat element and a pin seal. The capsule body may have a generally open distal end and a closed proximal end. The capsule body may be least partially defined by a capsule wall housing a cavity therein. The cavity may extend, for example, generally from the distal end toward the proximal end. The capsule wall may have an inner surface, an outer surface and at least one capsule port extending therethrough. The capsule subassembly may be in removable received engagement with the main bore and disposed thereat in fluid communication between a source chamber and an output chamber.

The piston may be received by the cavity for defining, at least in part, a pressurizible bias chamber within the cavity and for slidable axial movement of the piston within the cavity between a fluid release configuration, a fluid seal configuration, and in some embodiments, a charge configurations. The seat element may have a pin bore and a pin seal seat. The seat element may be, for example, press-fit or threaded into the capsule body. In certain embodiments, the seat element is threadedly moveable between a charge position and an operational position. The pin seal may have a pin shaft and a pin seal face. The pin shaft may extend through the pin bore and be in fixed connection with the piston. Embodiments may include a retainer element for, at least in part, axially retaining or securing the capsule body within the main bore.

When the piston is in its fluid release configuration, the capsule ports are in fluid communication with the distal end of the capsule body. When the piston is in its fluid seal configuration the capsule ports are sealed from fluid communication with the bias chamber and the distal end. In particular embodiments in which the piston has a charged configuration, when the piston is in its charge configuration, the capsule ports are in fluid communication with the bias chamber.

In certain embodiments having a seat element, threaded movement of the seat element into its charge position may results in movement of the piston to its charged configuration. Contrastingly, threaded movement of the seat element into its operational position may force the piston toward its fluid release configuration.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
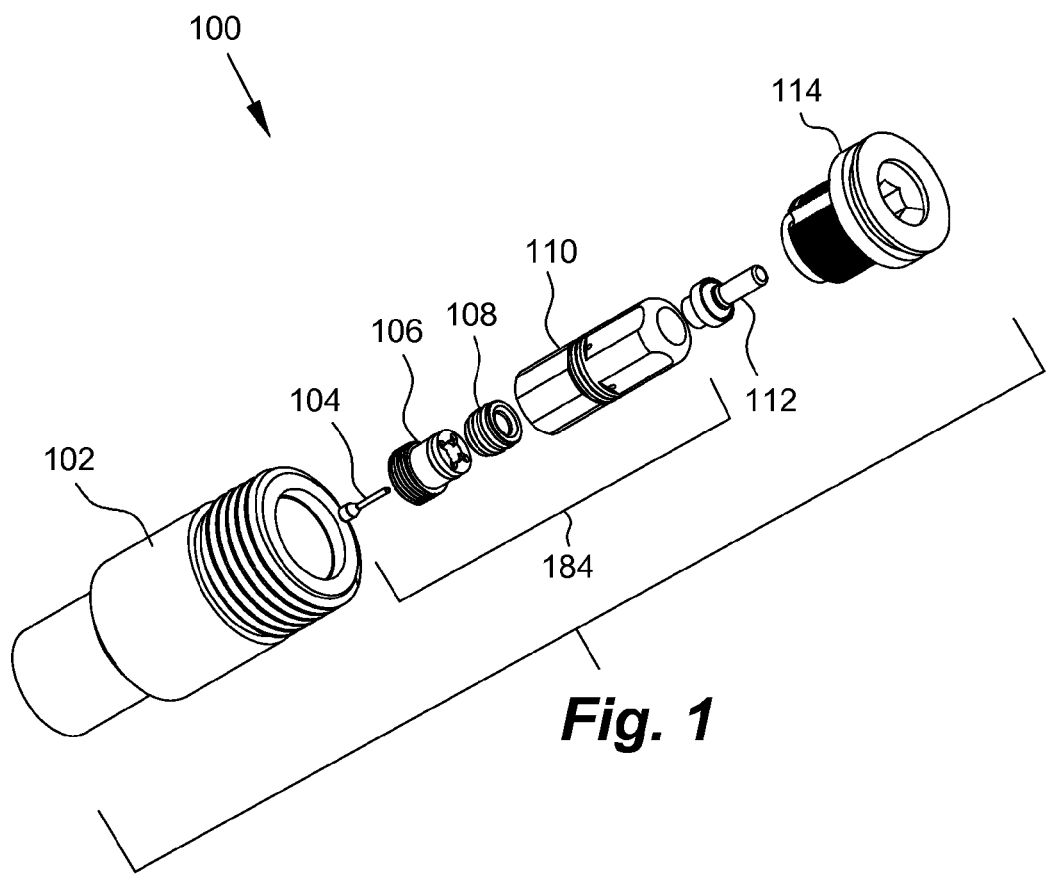
FIG. 1 is a diagrammatic exploded view of a pressure regulator in accordance with the present invention.

Referring now to the drawings, like reference numerals designate identical or corresponding features throughout the several views. Shown generally at 100 are one or more embodiments of a pressure regulator in accordance with the description herein. Referring to FIG. 1 for illustration, a pressure regulator 100 may comprise, for example, a regulator body 102 and a capsule subassembly 184.

Certain embodiment of a regulator body 102 may have a source end 144, an application end 146, a main bore 150 extending therebetween, a first portion 152 at the source end 144 and a second portion 154 at the application end 146. The source end 144 may be adapted to being placed in fluid communication with a source of pressurized gas, such as the tank shown at 192 in FIG. 31.

Particular embodiments of a capsule subassembly 184 may include a capsule body 110 and a piston 108. The capsule body 110 may have a distal end 178 and a proximal end 176, and may be at least partially defined by a capsule wall 210 housing a cavity 204 therein. The cavity 204 may extend generally from the distal end 178 toward the proximal end 176. The capsule wall may have an inner surface 200, an outer surface 202 and at least one capsule port 122 extending therethrough. The capsule subassembly 184 may be adapted to being in removable received engagement with the main bore 150 and disposed thereat in fluid communication between a source chamber 118 and an output chamber 120 such that, for example, the distal end 178 is in fluid communication with the source chamber 118.

In particular preferred embodiments, the piston 108 may be adapted to being received by the cavity 204 for defining, at least in part, a pressurizible bias chamber 116 within the cavity 204 and for slidable axial movement of the piston 108 within the cavity 204 between a fluid release configuration, a fluid seal configuration, and in certain embodiment, a charge configuration. When the piston is in its fluid release configuration (as illustrated, for example, FIG. 30), the at least one capsule port 122 may be in fluid communication with the distal end 178, and thereby the source chamber 118. When the piston 108 is in its fluid seal configuration (as illustrated, for example, FIG. 29), the at least one capsule port 122 is sealed from fluid communication with the bias chamber 116 and the distal end 178. In embodiments in which the piston 108 has a charge configuration, when the piston 108 is in its charge configuration (as illustrated, for example, FIG. 27), the at least one capsule port 122 may be in fluid communication with the bias chamber 116.

In embodiments in which the piston 108 does not have a charge configuration, the bias chamber 116 may be pressurized or "charged" by way of, for example, a charge aperture at or near the proximal end. In such embodiments, the aperture may be sealed prior to the capsule subassembly 184 being used in operation of the pressure regulator.

In certain embodiments, the capsule subassembly 184 may include a seat element 106 and a pin seal 104. The seat element 106 may have a pin bore 186 and a pin seal seat 172. Referring initially to FIG. 28 for illustration, the seat element 106 may be adapted to be secured in connection with the capsule body 110 by way of, for example, threaded engagement, press fit or other axial securing means. Alternatively or in addition, the seat element 106 may be adapted for threaded movement between a charge position (as illustrated, for example, at FIG. 27) and an operational position (as illustrated, for example, at FIG. 29. The pin seal 104 may have a pin shaft 208 and a pin seal face 174. The pin shaft 208 may be adapted to extend through the pin bore 186 and be in fixed connection with the piston 108. The pin seal face 174 may be adapted to move into and out of sealing engagement with the pin seal seat 172 thereby respectively preventing and allowing fluid flow through the pin bore (as illustrated, for example, between FIGS. 29 and 30).

Figure 27:
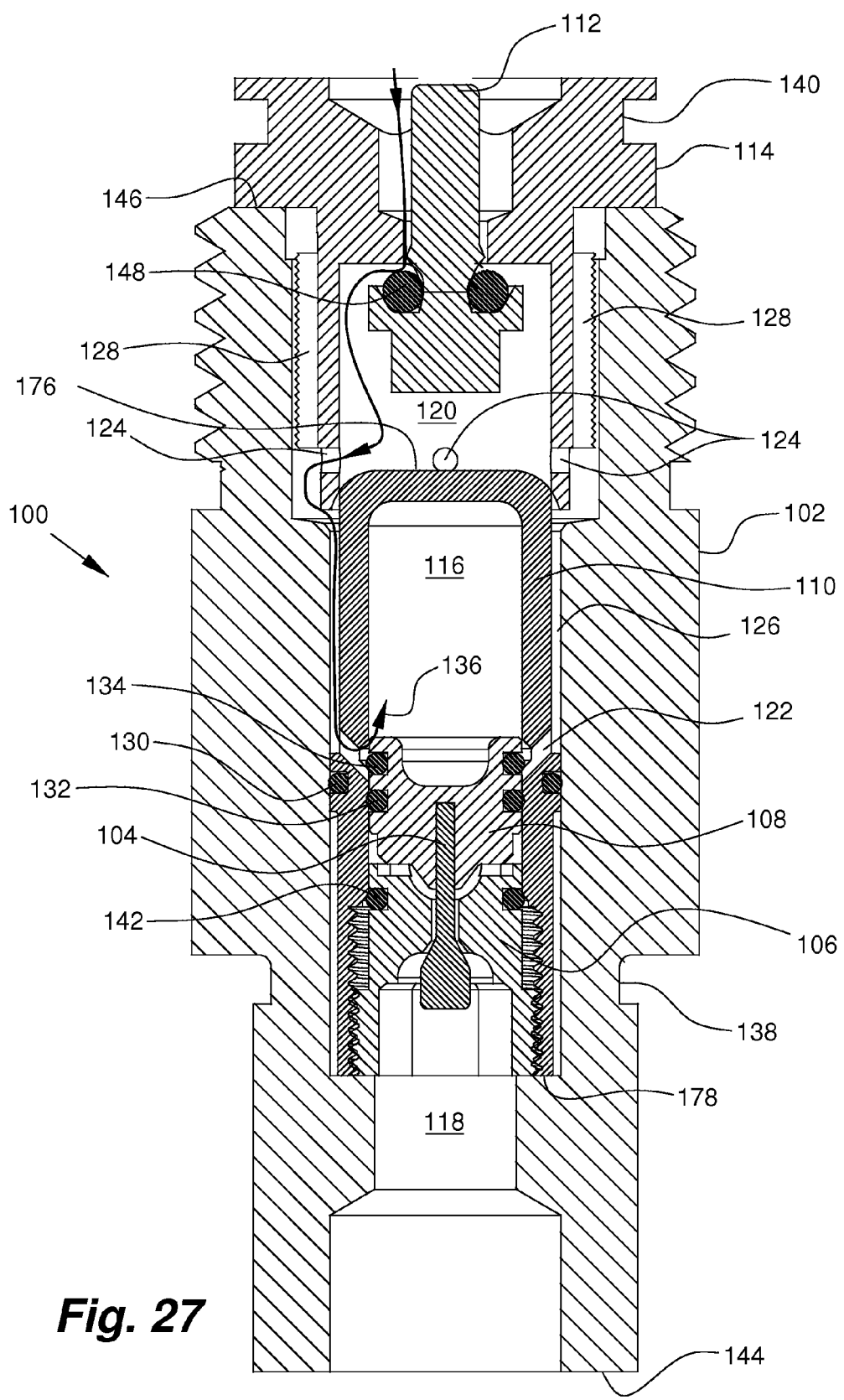
FIG. 27 is a diagrammatic cross-sectional view of an embodiment of a pressure regulator, showing the seat element outwardly threaded to allow the bias chamber to be in fluid communication with the capsule ports, thereby allowing the bias chamber to be pressurized by way of the capsule ports.
Figure 28:
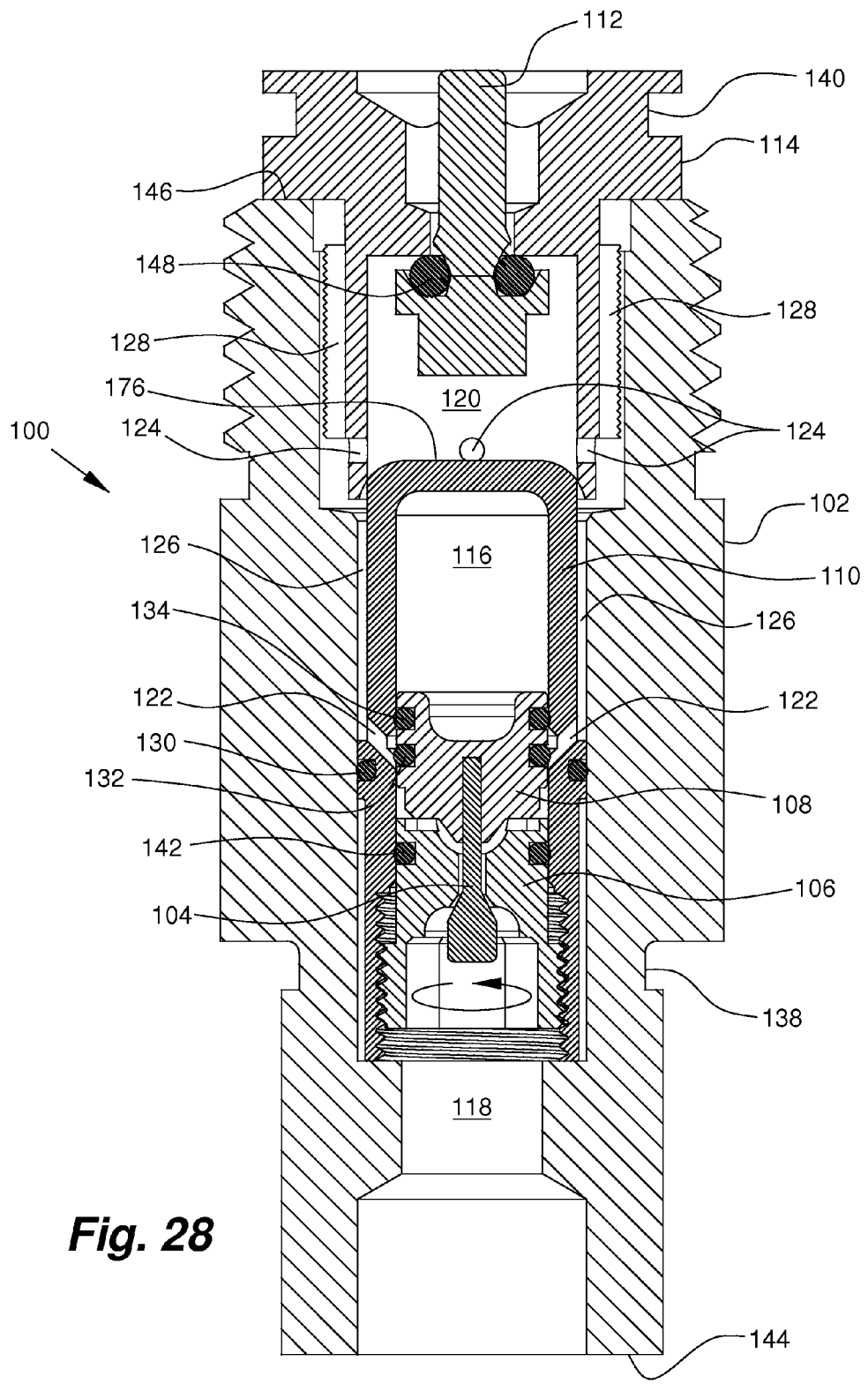
FIG. 28 is a further diagrammatic cross-sectional view of an embodiment of a pressure regulator, showing the seat element in an intermediate threaded position whereby the pressurized bias chamber has been sealed from fluid communication with the capsule ports.

As illustrated in FIG. 27, for example, in particular embodiments so adapted, threaded movement of the seat element 106 into a charge position may result in movement of the piston 108 to its charged configuration. Contrastingly, threaded movement of the seat element 106 into its operational position (as illustrated, for example, in FIGS. 29-31) may force the piston 108 toward its fluid release configuration, that is, in a direction toward the proximal end 176.

Particular embodiments may further comprise a retainer element 114 adapted to threadedly engage the main bore 150 generally within the second portion 154, thereby axially retaining the capsule body 110 within the main bore 150. Embodiments may also comprise a poppet element 112, certain embodiments of which may be adapted to retain a poppet seal 148. In such embodiments, for example, the output chamber 120 may be defined, at least in part, by a combination or interface of the regulator body 102, the capsule body 110, the retainer element 114 and the poppet element 112.

In certain embodiments, the capsule body 110 includes a capsule seal groove 182 generally circumferentially disposed thereabout. The capsule seal groove 182 may be adapted to receive an outer capsule seal 130 for establishing a seal between the outer surface 202 and the main bore 150.

Figure 31:
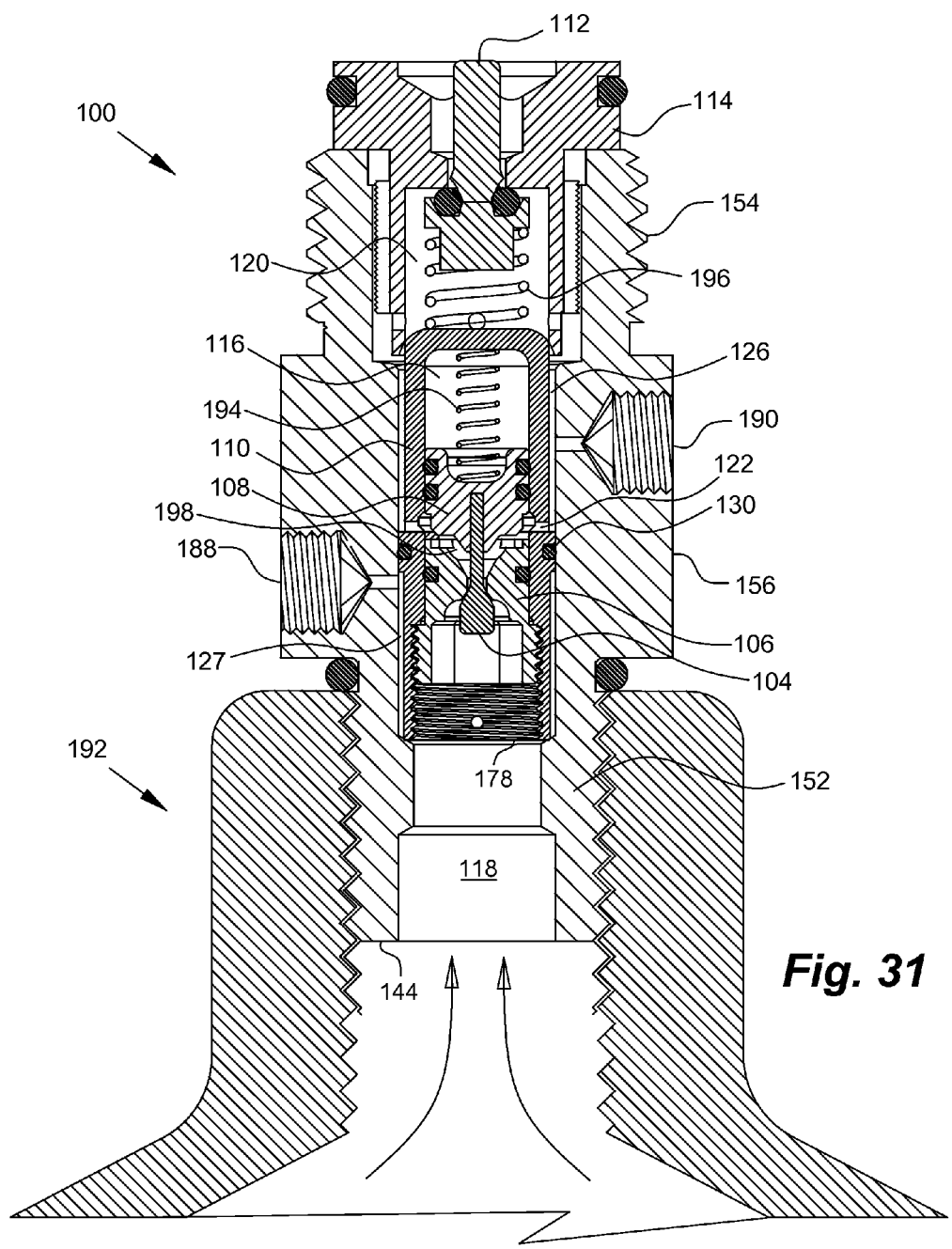
FIG. 31 is a further diagrammatic cross-sectional view of an embodiment of a pressure regulator which incorporates alternative examples of a regulator body, and capsule subassembly.

Referring to FIG. 31 for example, in particular embodiments, the regulator body 102 may further include an intermediate portion 156 disposed between the first portion 152 and the second portion 154. The intermediate portion 154 may have a plurality of generally radially extending ports, such as the illustrated high-side port 188 and the illustrated low-side port 190. In such embodiments, at least one of the generally radially extending ports (as shown at 188, for example) may be adapted to be in fluid communication with the source chamber 118 by way of a high-side flow channel 127 formed between the outer surface 202 and the main bore 150 when the capsule subassembly 184 is in removable received engagement with the main bore 150. In contrast, at least one of the generally radially extending ports (as shown at 190, for example) may be adapted to be in fluid communication with the output chamber 120 by way of a low-side flow channel 126 formed between the outer surface 202 and the main bore 150 when the capsule subassembly 184 is in removable received engagement with the main bore 150.

In certain embodiments, such as the one illustrated in FIG. 31 the first portion 152 may include external threads for threaded engagement with a reservoir 192 for storing pressurized gas, and the second portion may adapted to threadedly engage an application fitting (such as an ASA adaptor associated with a paintball marker).

In certain embodiments, the capsule subassembly 184 may include a light compression spring 194 adapted to be axially disposed within the bias chamber 116 to contribute, at least in part, to the overcoming of static friction between the piston 108 and the inner surface 200.

Embodiments in accordance with the description herein provide a pressure regulator 100 which may use a pre-loaded compression chamber or bias chamber 116, as a biasing means for the pressure regulating system. As a result, in typical embodiments, no significant spring bias may be required in the regulating mechanism, and the pressure within the bias chamber 116 can be set based on the desired output pressure of the regulator 100.

Figure 20:
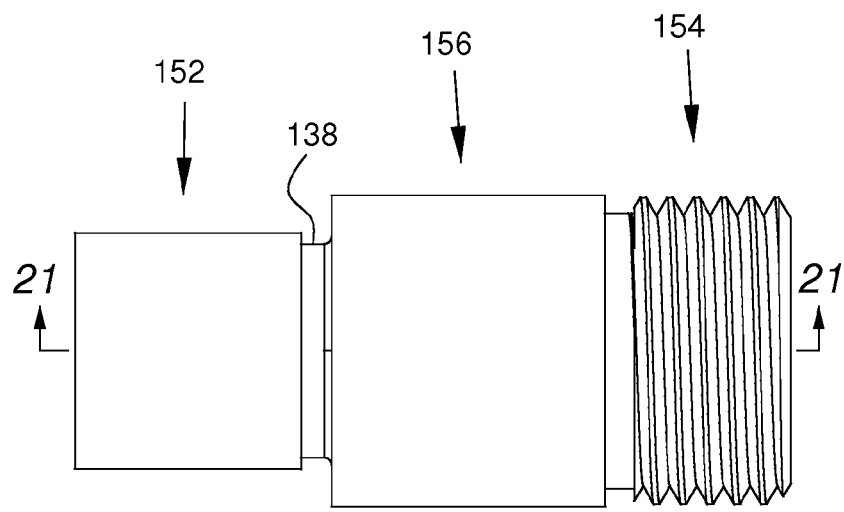
FIG. 20 is a diagrammatic side view of a regulator body.
Figure 21:
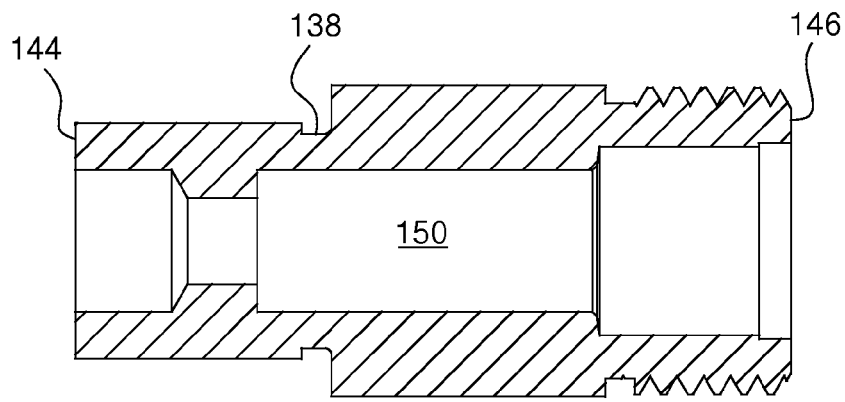
FIG. 21 is a diagrammatic cross-sectional view taken along line 21-21 in FIG. 20.
Figure 22:
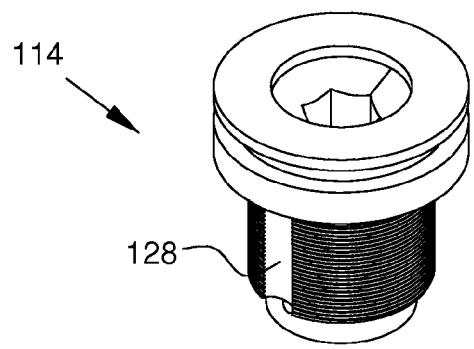
FIG. 22 is a diagrammatic perspective view of a retainer element.
Figure 23:
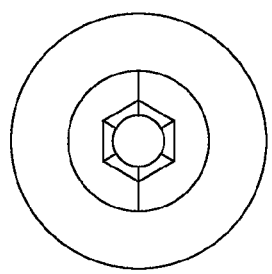
FIG. 23 is a diagrammatic end view of the retainer element shown in FIG. 22.
Figure 24:
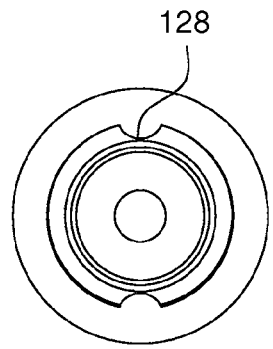
FIG. 24 is a further diagrammatic end view of the retainer element shown in FIG. 22, showing the opposite end from that of FIG. 23.
Figure 25:
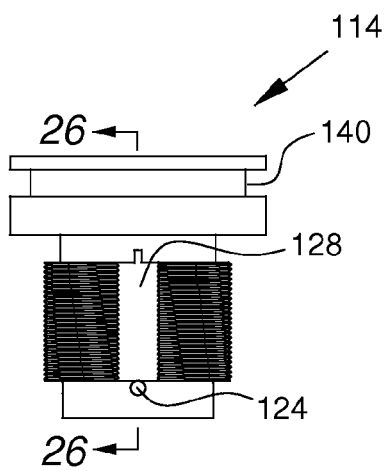
FIG. 25 is a diagrammatic side view of the retainer member shown in FIG. 22.
Figure 26:
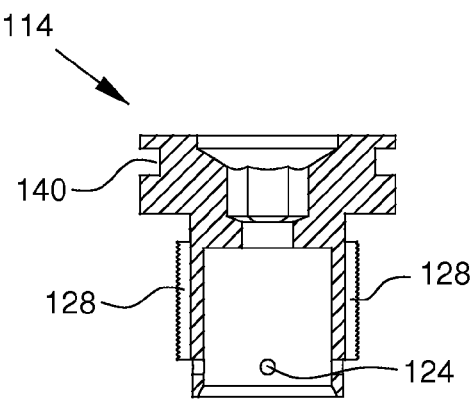
FIG. 26 is a diagrammatic cross-sectional view taken along line 26-26 in FIG. 25.

Referring to FIGS. 20 and 21 for illustration, a mounting tube or regulator body 102 may be made of, for example a metal such as aluminum 6061, and may include a source seal groove 138. The first portion 152 may include external threads (not shown) and may be adapted to be threadedly inserted into a source of pressurized gas. A source seal groove 138 may be adapted to retain an O-ring, as illustrated in FIG. 31, to aid in maintaining a seal between a source of pressurized gas 192 and the regulator body 102. A second portion 154 may include external threading adapted to threadedly engage, for example, an adaptor fitting associated with an application device such as a paintball marker. The generally radially extending ports may include one or more of a pressure gauge port, a fill port, high-pressure burst disk port and a low-pressure burst disk port.

Referring to FIGS. 12 through 19 for illustration, a capsule body 110 may be made of for example, aluminum 6061 or a strong Nylon, and may include one or more low-pressure channel reliefs 158, one or more high-pressure channel reliefs 206, one or more capsule ports 122, an annular groove 180 and a capsule seal groove 182. In certain embodiments, the capsule body 110 may have a capsule length defined by the distance between the capsule proximal end 176 and the capsule distal end 178. In particular embodiments, the capsule length may be, for example, approximately one inch.

Figure 9:
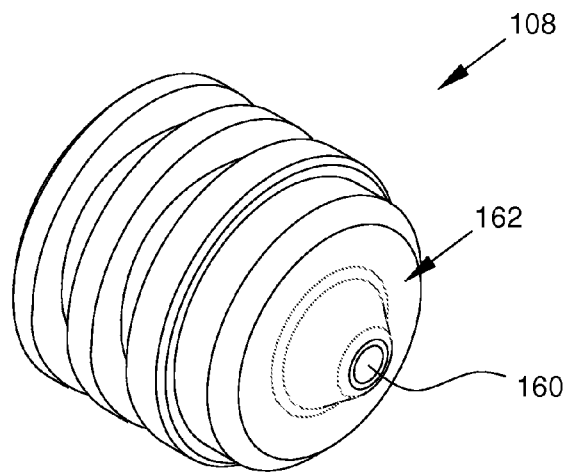
FIG. 9 is a diagrammatic perspective view of a piston.
Figure 10:
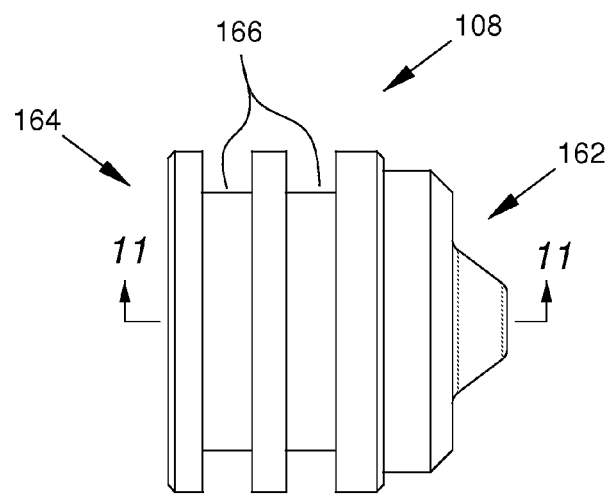
FIG. 10 is a diagrammatic side view of the piston shown in FIG. 9.
Figure 11:
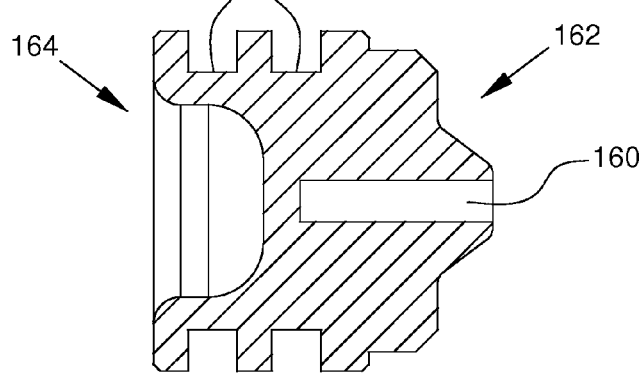
FIG. 11 is a diagrammatic cross-sectional view taken along line 11-11 in FIG. 10.
Figure 12:
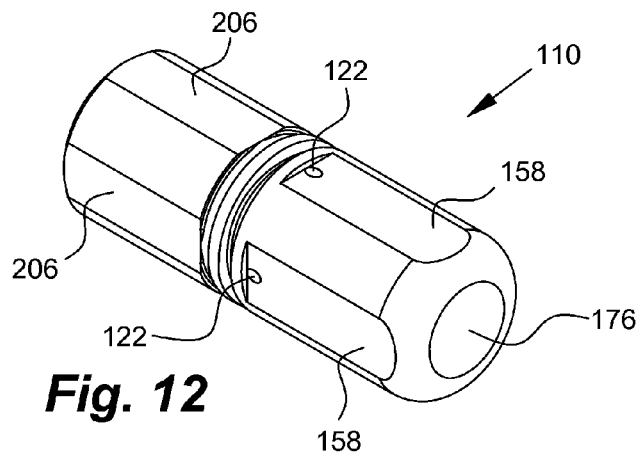
FIG. 12 is a diagrammatic perspective view of a capsule body.
Figure 13:
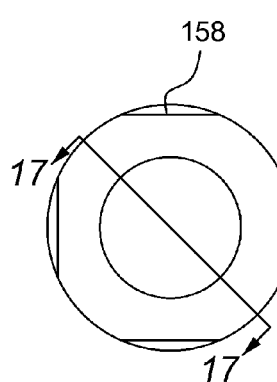
FIG. 13 is a diagrammatic end view of the capsule body shown in FIG. 12.
Figure 14:
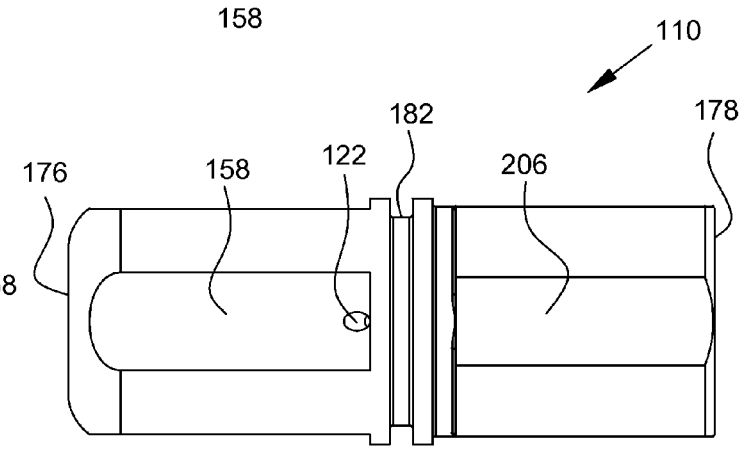
FIG. 14 is a diagrammatic side view of the capsule body shown in FIG. 12.
Figure 15:
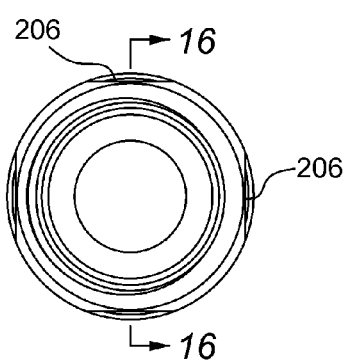
FIG. 15 is a further diagrammatic end view of the capsule body shown in FIG. 12.
Figure 16:
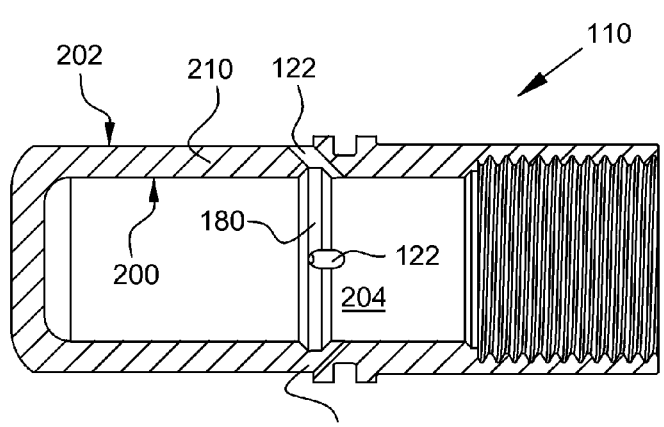
FIG. 16 is a diagrammatic cross-sectional view taken along line 16-16 in FIG. 15.
Figure 17:
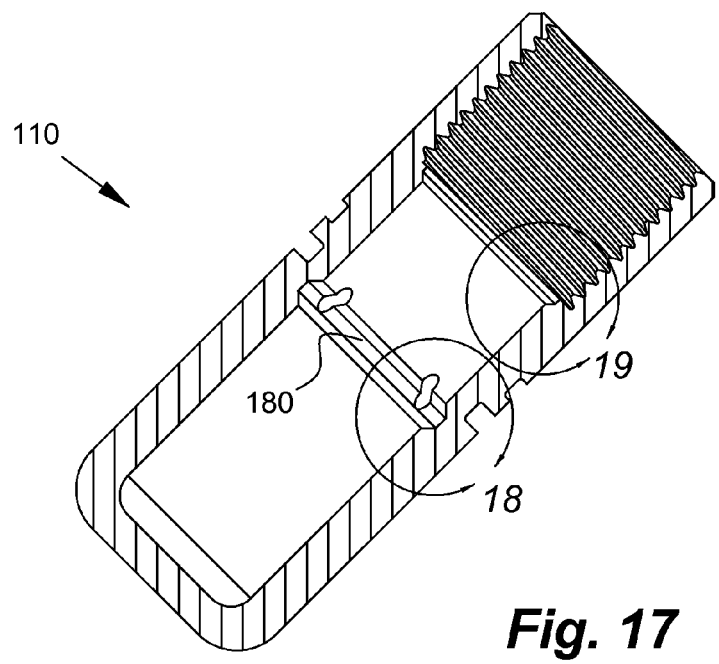
FIG. 17 is a diagrammatic cross-sectional view taken along line 17-17 in FIG. 13.
Figure 18:
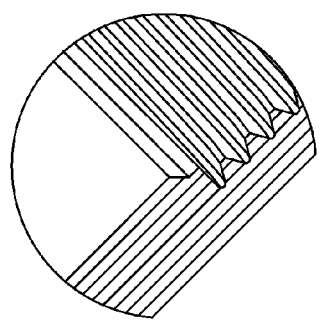
FIG. 18 is a diagrammatic view of detail 18 in FIG. 17.
Figure 19:
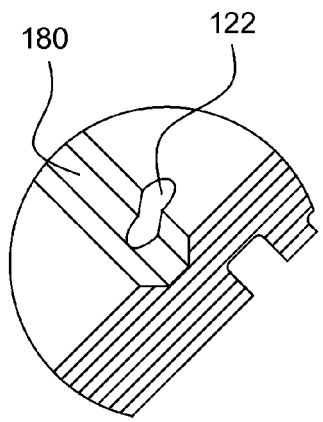
FIG. 19 is a diagrammatic view of detail 19 in FIG. 17.

Referring to FIGS. 9 through 11 for illustration, a piston 108 may be made of a metal, such as for example, brass, and may include a first piston surface 162, a second piston surface 164, one or more piston seal grooves 166 and a pin detent 160.

Referring to FIGS. 3 through 8 for illustration, a seat element 106 may include a seat seal groove 168, a manifold or piston seat 170, a pin seal seat 172 and a pin bore 186. The seat seal groove 168 may retain a seat seal 142. Particular preferred embodiments, the seat element 106 may be comprised substantially of a polymer such as DuPont's Delrin, another Polyoxymethyline, or similar material. Such materials may provide a significant operational advantage for the disclosed regulator, in that dirt or debris trapped between the pin seal face 174 and pin seal seat 172 may be substantially absorbed (e.g., compressively) by the seat element 106, thereby allowing an effective seal to continue to be established between the pin seal face 174 and the pin seal seat 172. In certain embodiments, the diameter of the pin bore 186 may be, for example, between 0.040 and 0.060 inches.

Figure 2:
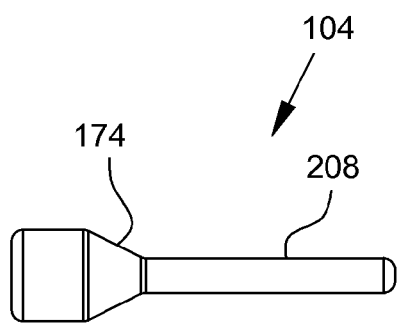
FIG. 2 is a diagrammatic side view of a pin seal element.
Figure 3:
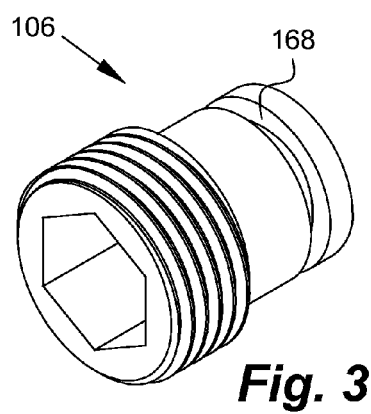
FIG. 3 is a diagrammatic perspective view of a seat element.
Figure 4:
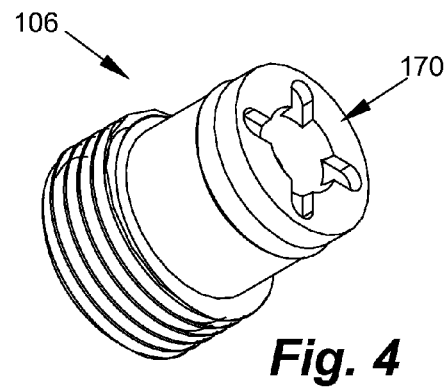
FIG. 4 is a further diagrammatic perspective view of the seat element of FIG. 3.
Figure 5:
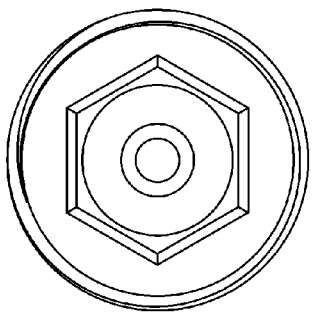
FIG. 5 is a diagrammatic end view of the seat element of FIG. 3.
Figure 6:
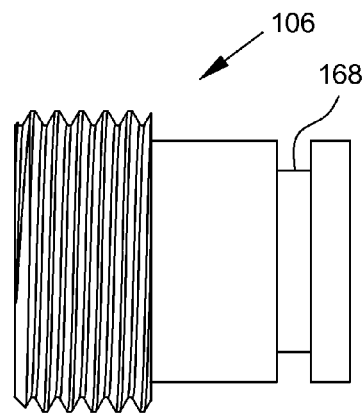
FIG. 6 is a diagrammatic side view of the seat element of FIG. 3.
Figure 7:
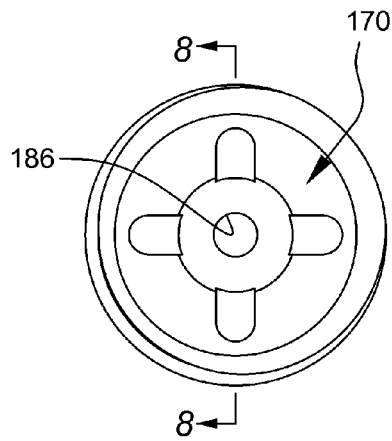
FIG. 7 is a further diagrammatic end view of the seat element of FIG. 3, showing the opposite end from that of FIG. 5.
Figure 8:
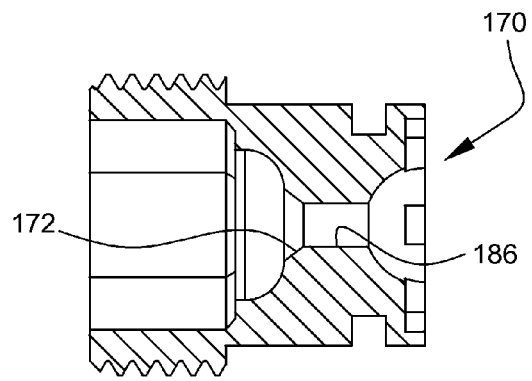
FIG. 8 is a diagrammatic cross-sectional view taken along line 8-8 in FIG. 7.

Referring to FIG. 2 for illustration, a pin seal 104 may be made of a metal such as, for example, stainless steel, or a durable polymer. The pin seal 104 may include a pin seal face 174 adapted to sealingly engage a pin seal seat 172 of a seat element 106.

Figures 32, 33:
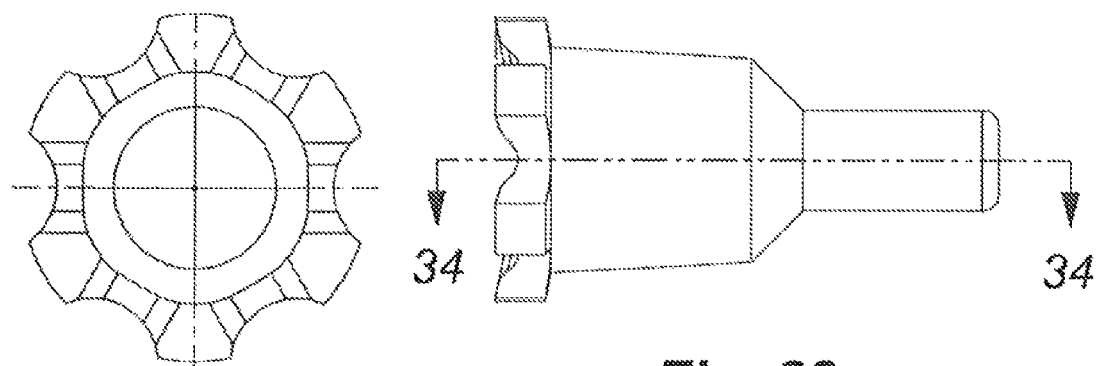
FIG. 32 is a diagrammatic end view of an alternative poppet element.
FIG. 33 is a diagrammatic side view of the alternative poppet element of FIG. 32.
Figure 34:
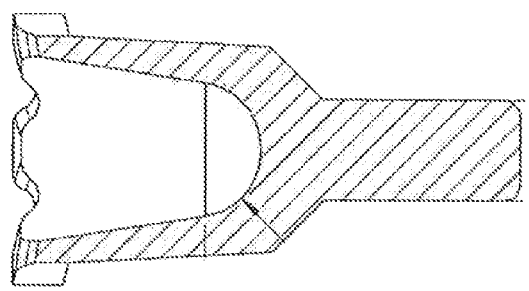
FIG. 34 is a diagrammatic cross-sectional view taken along line 34-34 in FIG. 33.

Referring to FIGS. 22 through 26 for illustration, a retainer element 114 may be made of, for example, aluminum 6061, and may include one or more retainer ports 124, one or more bleed grooves 128 and an application seal groove 140. A retainer element 114 is typically adapted to threadedly engage inner threading (not shown) of the second portion 154 of the regulator body 102. As illustrated, for example, in FIG. 27, while in this threaded engagement, the retainer element 114 may be relied upon to axially secure the capsule body 110 within the mounting tube or regulator body 102, and to limit the axial movement of a poppet element 112. In this configuration, the poppet element 112 may be elastically axially depressible by way of a poppet spring 196 generally disposed, for example, between the poppet element 112 and the proximal end 176 of the capsule body 110. In particular embodiments, the poppet may be made of a molded polymer or urethane (such as the poppet element depicted in FIGS. 32 through 34, for example). Further, in certain embodiments, the poppet element may be adapted so that the pressure within the output chamber 120 is sufficient to depressibly force the poppet into its sealing position.

As illustrated, for example, in FIG. 27, the bias chamber 116 can be filled to a selected preload pressure when the seat element 106 is threadedly moved toward the capsule distal end 178, otherwise referred to as a fill configuration. In certain embodiments, the selected preload pressure may be, for example, approximately 20% over the desired output pressure of the regulator. In the fill configuration the seat element 106 may hold the piston 108 in a fill position by way of the pin seal 104. In its fill position, the piston 108 may allow the capsule ports 122 to remain in fluid communication with the bias chamber 116 in bypass of the manifold chamber 198, thus allowing pressurized gas to enter the bias chamber 116 by way of, for example, a depressed poppet element 112. Such a pathway is at least partially illustrated by bias chamber fill flow path 136, which may extend through the output chamber 120, retainer ports 124, flow channels 126 and finally through capsule ports 122. In certain embodiments, the capsule ports 122 may be accessed for bias chamber 116 pressurization by way of, for example, a radially-disposed capsule fill port (not shown) in the intermediate portion 156 of a regulator body 102.

Referring now to FIG. 28, once the bias chamber 116 is pressurized to the selected preload pressure, the seat element 106 may be threaded toward the capsule proximal end 176, thereby moving the piston 108 axially such that the capsule ports become sealed from fluid communication with the bias chamber 116, and enter fluid communication with the manifold chamber 198. This seal may be provided by way of, for example, the first piston seal 132 and second piston seal 134. A seat element 106 is shown in its fully inwardly threaded position in FIG. 29.

Figure 29:
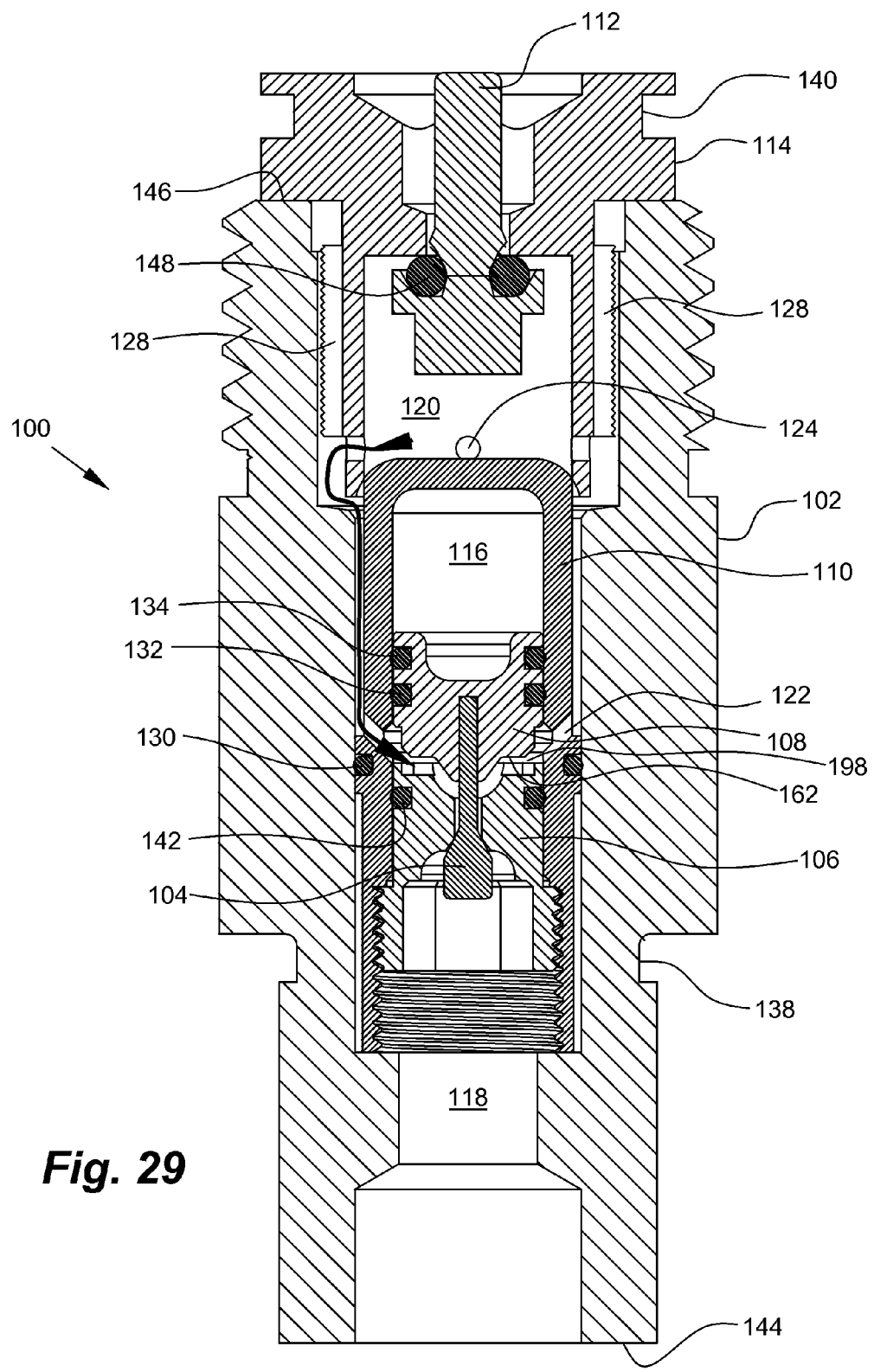
FIG. 29 is a further diagrammatic cross-sectional view of an embodiment of a pressure regulator, in which the seat element is fully inwardly threaded and the pressure within the output chamber is sufficient to aid in overcoming the force on the piston imposed by the pressure within the bias chamber, thereby resulting in the sealing engagement between the pin seal and the pin seal seat.
Figure 30:
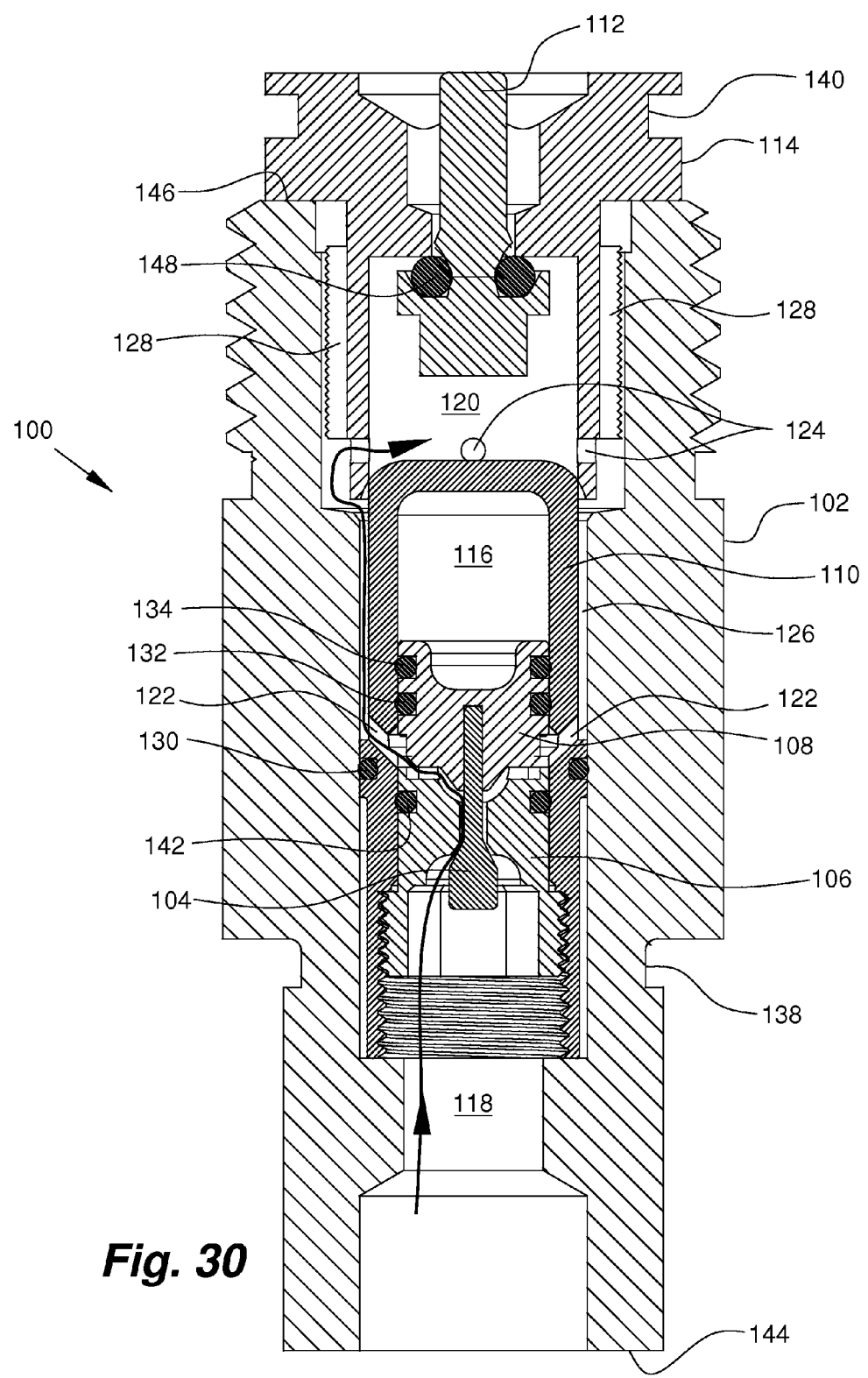
FIG. 30 is a further diagrammatic cross-sectional view of an embodiment of a pressure regulator, showing the pin seal in an open configuration thereby allowing gas to flow from the source chamber to the output chamber.

As illustrated in FIGS. 29 and 30, during operation of a pressure regulator 100, the source chamber 118 is typically in fluid communication with a source of pressurized gas, such as a compressed Nitrogen or CO2 tank 192, and the output chamber 120 is provided with pressure-regulated gas which originates from the source chamber 118 and is regulated by the capsule subassembly 184.

As illustrated in particular in FIG. 29, when the desired output pressure is reached or exceeded within the output chamber 120, the output pressure acts against the first piston surface 162 to help move the piston 108 against the force of the bias pressure within the bias chamber 116. As a result, the pin seal face 174 may be forced to seat against the pin seal seat 172 and cut off flow from the source chamber 118 to the output chamber 120. Notably, preferred embodiments of the pressure regulator described herein are configured so that high pressure from the source chamber 118 works toward urging the sealing of the bore 186 rather than toward its unsealing. This provides a safety mechanism which may significantly reduce the chance that the regulator will fail in the open position, particularly when such configuration is combined with the debris-absorbing qualities of the material of which preferred seat elements 106 may be comprised.

As illustrated in particular in FIG. 30, when the output pressure falls below the desired level, the force exerted on the first piston surface 162 is insufficient to cause movement of the piston 108 against the bias pressure within the bias chamber 116. As a result, the piston 108 is forced toward the piston seat 170 and the pin seal face 174 becomes unseated from the pin seal seat 172, allowing gas to flow from the source chamber 118 to the output chamber 120 through, for example, the pin bore 186.

In certain embodiments and related methods, a bias chamber 116 may be pressurized or "charged" to the selected preload or bias pressure, as described, while the capsule subassembly 184 is temporarily disposed within a mounting or "charge" tube separate from the regulator body 102 shown, for example, in FIG. 31. The capsule subassembly 184 with pressurized bias chamber 116 may then be removed from the separate mounting tube and placed into a regulator body as illustrated, for example, in FIG. 31, for use, for example, in cooperation with a portable compressed air tank associated with a paintball marker.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A pressure regulator comprising:
   a regulator body having a source end, an application end and a main bore extending therebetween, a first portion at the source end and a second portion at the application end, wherein the source end is adapted to being placed in fluid communication with a source of pressurized gas; and
   a capsule subassembly including a capsule body and a piston, the capsule body having a distal end and a proximal end, and being at least partially defined by a capsule wall housing a cavity therein, the cavity extending generally from the distal end toward the proximal end, the capsule wall having an inner surface, an outer surface and at least one capsule port extending therethrough;
   wherein the capsule subassembly is adapted to being in removable received engagement with the main bore and disposed thereat in fluid communication between a source chamber and an output chamber such that the distal end is in fluid communication with the source chamber; and
   wherein the piston is adapted to being received by the cavity for defining, at least in part, a pressurizible bias chamber within the cavity and for slidable axial movement of the piston within the cavity between a charge configuration, a fluid release configuration and a fluid seal configuration, the at least one capsule port being in fluid communication with the bias chamber when the piston is in its charge configuration, the at least one capsule port being in fluid communication with the distal end when the piston is in its fluid release configuration, and the at least one capsule port being sealed from fluid communication with the bias chamber and the distal end when the piston is in its fluid seal configuration.

2. A pressure regulator as defined in claim 1 in which the capsule subassembly incudes a seat element and a pin seal, the seat element having a pin bore and a pin seal seat and being adapted for threaded movement between a charge position and an operational position, the pin seal having a pin shaft and a pin seal face;
   wherein the pin shaft is adapted to extend through the pin bore and be in fixed connection with the piston, and the pin seal face is adapted to move into and out of sealing engagement with the pin seal seat thereby respectively preventing and allowing fluid flow through the pin bore; and
   wherein threaded movement of the seat element into its charge position results in movement of the piston to its charged configuration, and threaded movement of the seat element into its operational position forces the piston toward its fluid release configuration.

3. A pressure regulator as defined in claim 1 in which the seat element is comprised substantially of a polymer.

4. A pressure regulator as defined in claim 1 in which the seat element is comprised substantially of Polyoxymethyline.

5. A pressure regulator as defined in claim 1 further comprising a retainer element adapted to threadedly engage the main bore generally within the second portion, thereby axially retaining the capsule body within the main bore.

6. A pressure regulator as defined in claim 1 further comprising a poppet element, the output chamber being defined, at least in part, by the regulator body, the capsule body, the retainer element and the poppet element.

7. A pressure regulator as defined in claim 1 in which the capsule body includes a capsule seal groove generally circumferentially disposed thereabout, the capsule seal groove being adapted to receive an outer capsule seal for establishing a seal between the outer surface and the main bore.

8. A pressure regulator as defined in claim 1 in which the regulator body further includes an intermediate portion disposed between the first portion and the second portion, the intermediate portion having a plurality of generally radially extending ports;

wherein at least one of the generally radially extending ports is adapted to be in fluid communication with the source chamber by way of a high-side flow channel formed between the outer surface and the main bore when the capsule subassembly is in removable received engagement with the main bore; and wherein at least one of the generally radially extending ports is adapted to be in fluid communication with the output chamber by way of a low-side flow channel formed between the outer surface and the main bore when the capsule subassembly is in removable received engagement with the main bore.

9. A pressure regulator as defined in claim 1 in which the first portion includes external threads for threaded engagement with a reservoir for storing pressurized gas, and the second portion is adapted to threadedly engage an application fitting.

10. A pressure regulator as defined in claim 1 in which the capsule subassembly includes a compression spring adapted to be axially disposed within the bias chamber to contribute, at least in part, to the overcoming of static friction between the piston and the inner surface.

11. A pressure regulator comprising:

a regulator body having a source end, an application end and a main bore extending therebetween, a first portion at the source end and a second portion at the application end, wherein the source end is adapted to being placed in fluid communication with a source of pressurized gas; and a capsule subassembly including a capsule body, a piston, a seat element and a pin seal, the capsule body having a generally open distal end and a closed proximal end, and being at least partially defined by a capsule wall housing a cavity therein, the cavity extending generally from the distal end toward the proximal end, the capsule wall having an inner surface, an outer surface and at least one capsule port extending therethrough, the capsule subassembly being in removable received engagement with the main bore and disposed thereat in fluid communication between a source chamber and an output chamber such that the distal end is in fluid communication with the source chamber, the piston being received by the cavity for defining, at least in part, a pressurizible bias chamber within the cavity and for slidable axial movement of the piston within the cavity between a charge configuration, a fluid release configuration and a fluid seal configuration, the seat element having a pin bore and a pin seal seat, the seat element being threadedly moveable between a charge position and an operational position, the pin seal having a pin shaft and a pin seal face, the pin shaft extending through the pin bore and being in fixed connection with the piston;

a retainer element in threaded engagement the main bore generally within the second portion, thereby axially retaining the capsule body within the main bore;

wherein the at least one capsule port is in fluid communication with the bias chamber when the piston is in its charge configuration, the at least one capsule port is in fluid communication with the distal end when the piston is in its fluid release configuration, and the at least one capsule port is sealed from fluid communication with the bias chamber and the distal end when the piston is in its fluid seal configuration;

wherein the pin seal face is adapted to move into sealing engagement with the pin seal seat and thereby prevent fluid flow through the pin bore when the piston is in its fluid seal configuration, and the pin seal face is adapted to move out of sealing engagement with the pin seal thereby allowing fluid flow through the pin bore when the piston is in its fluid release configuration; and wherein threaded movement of the seat element into its charge position results in movement of the piston to its charged configuration, and threaded movement of the seat element into its operational position forces the piston toward its fluid release configuration.

12. A pressure regulator as defined in claim 11 in which the capsule body includes a capsule seal groove generally circumferentially disposed thereabout, the capsule seal groove being adapted to receive an outer capsule seal for establishing a seal between the outer surface and the main bore.

13. A pressure regulator as defined in claim 11 in which the seat element is comprised substantially of a polymer.

14. A pressure regulator as defined in claim 11 in which the regulator body further includes an intermediate portion disposed between the first portion and the second portion, the intermediate portion having a plurality of generally radially extending ports;

wherein at least one of the generally radially extending ports is in fluid communication with the source chamber by way of a high-side flow channel formed between the outer surface and the main bore; and wherein at least one of the generally radially extending ports is in fluid communication with the output chamber by way of a low-side flow channel formed between the outer surface and the main bore.

\* \* \* \* \*